No. 744,297. PATENTED NOV. 17, 1903.
E. R. COOK.
FLUID PRESSURE REGULATOR.
APPLICATION FILED MAY 19, 1902.
NO MODEL.
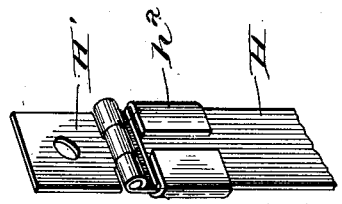
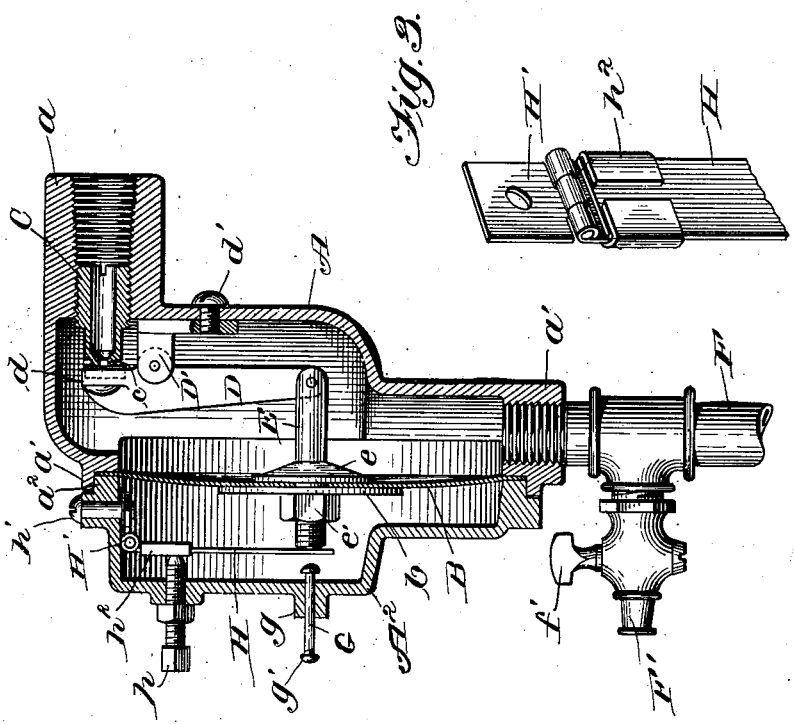
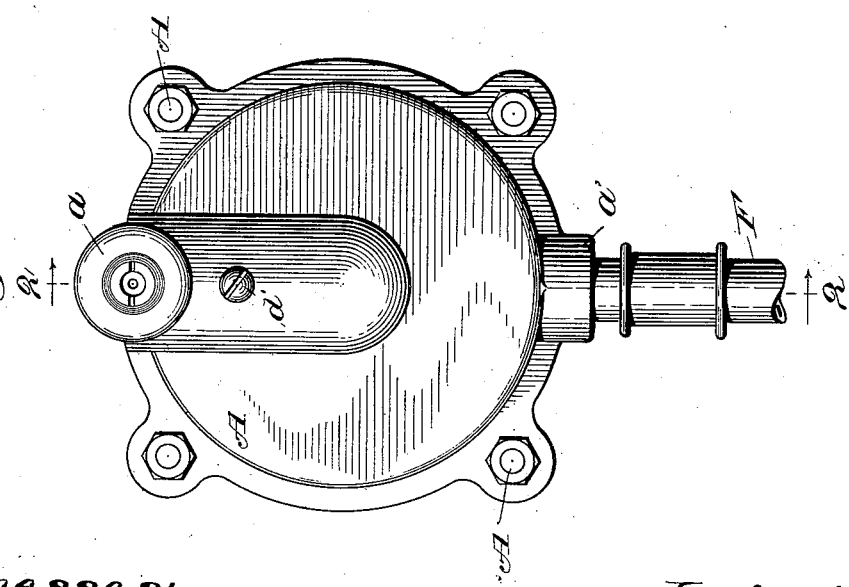
Witnesses:
H. S. Gaither
Clara C. Cunningham
Inventor:
Edmund R. Cook.
by Chamberlin & Wilkinson
Attorneys No. 744,297. Patented November 17, 1903.

UNITED STATES PATENT OFFICE.

EDMOND R. COOK, OF SACRAMENTO, CALIFORNIA.

FLUID-PRESSURE REGULATOR.

SPECIFICATION forming part of Letters Patent No. 744,297, dated November 17, 1903.

Application filed May 19, 1902. Serial No. 108,023. (No model.)

*To all whom it may concern:*

Be it known that I, EDMOND R. COOK, a citizen of the United States, residing at Sacramento, county of Sacramento, State of California, have invented a certain new and useful Improvement in Fluid-Pressure Regulators; and I declare the following to be a full, clear, and exact description of the invention, such as will enable others skilled in the art to which it pertains to make and use the same, reference being had to the accompanying drawings, which form a part of this specification.

My invention relates generally to fluid-pressure regulators, and more particularly to reducing-valve devices.

In regulators for reducing a high pressure at a source of supply—such, for instance, as a storage-reservoir or generator—to a relatively low pressure per square inch it is essential that the friction of the moving parts should be reduced to a minimum in order that the desired pressure may be maintained constant, regardless of variations in the degree of pressure at the source.

The operation of fluid-pressure regulators is frequently rendered uncertain and irregular owing to deposits made by the fluid or by foreign matter carried into the regulator by the fluid under pressure. It is consequently desirable that such regulators should be capable of readily blowing out the deposits or foreign matter in order that the most favorable conditions for the operation of the regulator may be secured.

The object of my invention is to provide a fluid-pressure regulator for reducing the pressure from the source—as, for instance, an acetylene-gas generator—and for maintaining a constant pressure at the point of use—as, for instance, the acetylene-gas burner—in which the moving parts have pivotal connections and are entirely free from any sliding engagement with each other.

A further object of my invention is to provide a fluid-pressure regulator such as above referred to with means for easily blowing out foreign matter without the necessity of taking the regulator apart.

A further object of my invention is to provide a fluid-pressure regulator which will be simple in construction, inexpensive in manufacture, and efficient in operation.

My invention, generally described, comprises a casing, a diaphragm secured within the casing, so as to form a chamber for receiving the fluid from the source thereof, a delivery-conduit connected to the chamber, a valve-seat through which the fluid-pressure passes to the chamber, an oscillating valve operatively connected to the diaphragm and adapted to swing into and out of engagement with the valve-seat, and means for manually unseating the valve to blow out the regulator.

My invention will be more fully described hereinafter with reference to the accompanying drawings, in which the same is illustrated as embodied in a convenient and practical form, and in which—

Figure 1 is an elevational view of my improved regulator; Fig. 2, a vertical section taken on line 2 2, Fig. 1; and Fig. 3, an enlarged detail view.

The same reference characters are used in the several figures to designate the same parts.

Reference characters $A'$ and $A^2$ designate the two parts of a casing, which are secured together by any suitable means—as, for instance, by bolts A, passing through registering openings formed in projections extending radially from the two parts of the casing, as illustrated in Fig. 1. A flexible partition or diaphragm B is secured between the adjoining flanges $a'$ and $a^2$ of the respective parts $A'$ and $A^2$ of the casing. A post E is radially secured to the diaphragm, near the center thereof, by any suitable means—such, for instance, as a circular flange $e$, secured to the post E, between which and a washer $b$ the diaphragm B is clamped. The end of the post E passes through the diaphragm and also through the washer $b$ and is provided with a screw-threaded end, upon which a nut $e'$ is located.

Within the chamber formed between the diaphragm and the part $A'$ of the casing is pivotally mounted a lever D. This lever is preferably of the first order and is fulcrumed upon a bracket $D'$, secured to the wall of the part $A'$ of the casing by any suitable means—as, for instance, the screw $d'$. One end of the lever D is pivotally secured to the end of the post E. The opposite end of the lever D is provided with a recess in which is located a valve $d$, preferably formed of oiled leather.

The part A' of the casing is provided with an interiorly-screw-threaded tubular projection $a$, with which is coupled a conduit leading from a source of pressure-supply—as, for instance, an acetylene-gas generator. A valve-seat C is exteriorly screw-threaded and is inserted in the opening through the projection $a$ and screwed therein, so that the end $c$ of the valve-seat projects within the chamber in the path of movement of the end of the lever D to which the valve $d$ is secured.

A delivery-conduit F is secured within a screw-threaded opening $a'$, formed through the part A' of the casing. A nozzle F' projects from a T-coupling located in the delivery-conduit F. The passage through the nozzle F' is controlled by a cock $f'$.

Located within the chamber formed between the diaphragm B and the part $A^2$ of the casing is a leaf-spring H, preferably tapered toward its lower end, as indicated in Fig. 3, engaging the end of the post E and tending to unseat the valve $d$ through the oscillation of the lever D. The spring H may be supported in the chamber in any suitable manner. Preferably, however, it depends from a hinged support H'. One portion of the hinge H' is rigidly secured to the wall of the casing $A^2$ by means of a screw and nut $h'$. A clip $h^2$ surrounds the depending portion of the hinge H' and clamps thereto the upper end of the spring H, as clearly shown in Fig. 3. The force with which the spring bears upon the end of the post E may be regulated by a set-screw $h$, which passes through a screw-threaded opening in the part of the casing $A^2$. A headed pin G passes through an opening formed in a boss $g$ in alinement with the post E. On the outer end of the pin G is secured a detachable head $g'$.

The operation of my improvement is as follows: The fluid-pressure from the source thereof flows through the coupling $a$, thence through the valve-seat C into the chamber formed between the diaphragm and the part A' of the casing, thence through the delivery-conduit F to the point of use—such, for instance, as an acetylene-gas burner. When the pressure within the chamber acting upon the diaphragm B slightly exceeds the tension of the spring H, the valve $d$ is swung into contact with the reduced end $c$ of the valve-seat. The valve continues seated until the pressure in the chamber falls below the tension of the spring H, which then through its contact with the post E oscillates the lever D and swings the valve away from its seat. The degree of pressure desired at the point of use is regulated by adjusting the tension of the spring H through the instrumentality of the set-screw $h$. When it is desired to blow out deposits from the fluid or foreign matter which may have been conveyed into the regulator by the fluid, the cock $f'$ is opened and the pin G forced within the chamber into which it projects. The engagement of the pin with the lower end of the spring H forces the latter, and with it the post E, toward the part A' of the casing, and thereby unseats the valve $d$ through the oscillation of the lever D. The fluid under pressure consequently flows through the valve-seat and removes therefrom any foreign matter, thence through the chamber between the diaphragm and the part A' of the casing, thence through the nozzle F' to the atmosphere. The interior of the valve-casing is thereby freed from any matter which might interfere with the proper seating of the valve $d$.

From the foregoing description it will be observed that I have devised an improved fluid-pressure regulator in which the valve swings into and out of engagement with the reduced end of a valve-seat and in which the relative movements between the parts of the regulator incident to the opening and closing of the valve are about pivotal points, thereby minimizing the friction incident to the operation of the regulator and rendering the regulator extremely sensitive. The fluid from a source of high pressure is consequently uniformly and exactly reduced to the required degree regardless of any variation or fluctuation in the pressure at the source thereof.

Having fully described my invention, what I claim as new, and desire to secure by Letters Patent, is—

1. In a fluid-pressure regulator, the combination with a casing, of a diaphragm supported within said casing, an inlet-conduit communicating with said casing, a valve-seat in which said inlet-conduit terminates, a valve pivotally mounted within said casing, connecting means interposed between said diaphragm and said valve whereby the valve is engaged with and disengaged from said valve-seat, an outlet-conduit leading from said casing, and a rod loosely sliding through said casing and adapted to be forced within said casing to deflect said diaphragm thereby disengaging the valve from its seat, said rod being disconnected from said diaphragm and consequently not moved by the deflections of the diaphragm due to variations in the pressure of the fluid.

2. In a fluid-pressure regulator, the combination with a casing, of a diaphragm located within said casing dividing the same into two chambers, inlet and outlet conduits connected with one of said chambers, a valve-seat secured in said inlet-conduit and projecting into the casing, a valve controlling the passage of fluid-pressure through said valve-seat, operative connections between the diaphragm and said valve, a leaf-spring located in the second chamber and engaging said diaphragm at one end and at its other end pivotally secured to the wall of said casing, and a hinge having one part rigidly secured to the interior of the casing and the other part secured to said spring.

3. In a fluid-pressure regulator, the combination with a casing having an inlet-opening, of a supply-conduit communicating with said opening, a diaphragm supported within said casing, a valve-seat secured in said inlet-opening and projecting within said casing, an outlet-conduit leading from said casing, a lever pivotally supported within said casing, a valve rigidly supported upon said lever, a post extending through said diaphragm and rigidly connected thereto, a leaf-spring located within said casing on the opposite side of the diaphragm from the valve, said spring being flexibly secured at one end to the casing and at its other end in engagement with an end of said post thereby tending to unseat the valve from said projecting valve-seat, a set-screw passing through and adjustably supported in the casing and engaging the leaf-spring, and a movable rod extending through said casing in alinement with said post and adapted when forced into the casing to unseat the valve.

In testimony whereof I have signed this specification in the presence of two witnesses.

EDMOND R. COOK.

Witnesses:
GEO. L. WILKINSON,
CLARA C. CUNNINGHAM.